US012730680B2

(12) United States Patent
Swiedler et al.

(10) Patent No.: US 12,730,680 B2
(45) Date of Patent: Sep. 8, 2026

(54) MANAGING RESOURCE UTILIZATION TO IMPROVE USER EXPERIENCES WITHIN A VIRTUAL EXPERIENCE

(71) Applicant: Roblox Corporation, San Mateo, CA (US)

(72) Inventors: Christopher Swiedler, San Mateo, CA (US); Richard Nelson, San Mateo, CA (US); Josh Anon, Los Angeles, CA (US); Angelo Pesce, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 136 days.

(21) Appl. No.: 18/590,172

(22) Filed: Feb. 28, 2024

(65) Prior Publication Data

US 2025/0272153 A1 Aug. 28, 2025

(51) Int. Cl.
*G06F 9/50* (2006.01)
*G06T 1/20* (2006.01)

(52) U.S. Cl.
CPC .............. *G06F 9/5044* (2013.01); *G06T 1/20* (2013.01)

(58) Field of Classification Search
CPC ....... G06T 1/20; G06F 9/5044; G06F 9/5083; H04L 67/025; H04L 67/125; H04L 67/131; H04L 67/1396
USPC .......................................................... 345/501
See application file for complete search history.

(56) References Cited

U.S. PATENT DOCUMENTS

| | | | | |
|---|---|---|---|---|
| 2017/0259177 | A1* | 9/2017 | Aghdaie | G06N 7/01 |
| 2020/0167985 | A1* | 5/2020 | Brennan | G06T 1/60 |
| 2020/0306632 | A1* | 10/2020 | Kolen | A63F 13/79 |

* cited by examiner

*Primary Examiner* — Jacinta M Crawford
(74) *Attorney, Agent, or Firm* — IP Spring

(57) ABSTRACT

In a virtual experience system, at least one metric associated with a user experience within a virtual experience is defined, the at least one metric having a plurality of possible values. A resource utilization factor having a plurality of levels corresponding to respective amounts of resource utilization by the virtual experience system is defined. A knob having a plurality of states is defined, each state corresponding to a respective level of the resource utilization factor. A prediction that associates a particular level of the resource utilization factor with a selected value of the at least one metric is generated. The knob is adjusted from a first state to a second state associated with the particular level of the resource utilization factor, based on the prediction.

20 Claims, 7 Drawing Sheets

520

| | FRM Level | Stream GC Radius | Asset Loader | FPS | RAM | Probability of Streaming Pause |
|---|---|---|---|---|---|---|
| 522 | 3 | 512 | 0 | 33 | 2.2GB | 25% |
| | ... | ... | ... | ... | ... | ... |
| 524 | 5 | 2048 | 10 | 28 | 3.0GB | 1% |
| 526 | **5** | **1024** | **10** | **32** | **2.8GB** | **2%** |
| 528 | 5 | 512 | 10 | 34 | 2.4GB | 25% |

| | FRM Level | Stream GC Radius | Asset Loader | FPS | RAM | Asset Quality Score |
|---|---|---|---|---|---|---|
| 542 | 13 | 512 | 0 | 100 | 2.2GB | 2 |
| | ... | ... | ... | ... | ... | ... |
| 544 | 17 | 4096 | 300 | 71 | 7.6GB | 80 |
| 546 | 17 | 4096 | 400 | 68 | 8.2GB | 90 |
| 548 | **17** | **4096** | **500** | **62** | **9.0GB** | **100** |

FIG. 5B

| FRM Level | Stream GC Radius | Asset Loader | FPS | Bandwidth |
|---|---|---|---|---|
| 8 | 512 | 0 | 67 | 1 Mbps |
| ... | ... | ... | ... | ... |
| **10** | **2048** | **10** | **60** | **20 Mbps** |
| 10 | 2048 | 20 | 57 | 35 Mbps |
| 11 | 2048 | 0 | 55 | 1 Mbps |

| FRM Level | Stream GC Radius | Asset Loader | FPS | RAM |
|---|---|---|---|---|
| 1 | 64 | 0 | 40 | 2.2GB |
| 1 | 64 | 50 | 35 | 2.6GB |
| ... | ... | ... | ... | ... |
| 3 | 256 | 300 | 31 | 3.8GB |
| 3 | 256 | 400 | 29 | 4.1GB |
| 3 | 256 | 500 | 25 | 4.5GB |

MANAGING RESOURCE UTILIZATION TO IMPROVE USER EXPERIENCES WITHIN A VIRTUAL EXPERIENCE

TECHNICAL FIELD

Implementations relate generally to computer graphics, and more particularly to systems, methods, and computer-readable media to manage resource utilization to improve user experiences within a virtual experience.

BACKGROUND

Virtual experiences are increasingly popular. Virtual experiences, including those provided in many games, virtual reality systems, etc., typically include dynamic three-dimensional environments that users can explore and interact with.

The three-dimensional environments can include rich, detailed graphics and animations that require significant amounts of resources (including memory, processing power, bandwidth, etc.) to render in real time as an avatar (associated with a user) moves through and interacts with the environment.

SUMMARY

Aspects of this disclosure are directed to methods, systems, and computer readable media to manage resource utilization to improve user experiences within a virtual experience.

In one aspect, a computer-implemented method comprises: defining at least one metric associated with a user experience within a virtual experience managed by a server system; defining a resource utilization factor having a plurality of levels corresponding to respective amounts of resource utilization by the server system, the resource utilization relating to use of at least one of processing power, memory, or network bandwidth; defining a knob having a plurality of settings, each setting corresponding to a respective level of the resource utilization factor; generating a prediction that associates a particular level of the resource utilization factor with a particular value of the at least one metric; and adjusting the knob from a first setting to a second setting associated with the particular level of the resource utilization factor, based on the prediction.

Various implementations of the computer-implemented method are described.

According to some implementations, the method further comprises: generating a model adapted to predict a relationship between the resource utilization factor and the at least one metric; generating the prediction that associates the particular level of the resource utilization factor with a particular value of the at least one metric, based on the model; and adjusting the knob from the first setting to the second setting, based on the prediction.

According to some implementations, the at least one metric comprises a measure of one of: a frame rate, an update latency, a coherence level, a functional world available, a simulation level, a probability of a crash, and a memory management.

According to some implementations, the resource utilization factor comprises one of: a draw distance, a rendering resolution, an animation throttling, a view distance, a texture, a mesh fidelity, a video playback rate, a music and sound effect, a visual effect, a lighting fidelity, and a physics/animation throttling.

According to some implementations, the method further comprises: defining a minimum value of the at least one metric; generating a prediction that the minimum value of the at least one metric is associated with the particular level of the resource utilization factor; and adjusting the knob from the first setting to the second setting associated with the particular level of the resource utilization factor, based on the prediction.

According to some implementations, the method further comprises: defining a second resource utilization factor having a plurality of second levels corresponding to respective second amounts of resource utilization by the server system; defining a second knob having a plurality of second settings, each second setting corresponding to a respective second level of the second resource utilization factor; generating a second prediction that associates a particular second level of the second resource utilization factor with a particular value of the at least one metric; and adjusting the knob from a first second setting to a second second setting associated with the particular second level of the second resource utilization factor, based on the second prediction.

According to some implementations, the prediction indicates that at least one level of the resource utilization factor is associated with a predicted value of the at least one metric that is below a predetermined limit; the method further comprising: adjusting the knob from the first setting to the second setting associated with the particular level of the resource utilization factor in order to reduce resource utilization and ensure that an actual value of the at least one metric does not fall below a predetermined limit, based on the prediction.

According to some implementations, the prediction indicates that at least one level of the resource utilization factor is associated with a predicted value of the at least one metric that is outside of a predetermined range; the method further comprising: adjusting the knob from the first setting to the second setting associated with the particular level of the resource utilization factor in order to reduce resource utilization and ensure that an actual value of the at least one metric does not fall outside of the predetermined range, based on the prediction.

According to another aspect, a device comprises: a memory storing computer program instructions; and a processor communicatively coupled to the memory, the processor configured to execute the computer program instructions which, when executed on the processor, cause the processor to perform operations comprising: defining at least one metric associated with a user experience within a virtual experience managed by a server system; defining a resource utilization factor having a plurality of levels corresponding to respective amounts of resource utilization by the server system, the resource utilization relating to use of at least one of processing power, memory, or network bandwidth; defining a knob having a plurality of settings, each setting corresponding to a respective level of the resource utilization factor; generating a prediction that associates a particular level of the resource utilization factor with a particular value of the at least one metric; and adjusting the knob from a first setting to a second setting associated with the particular level of the resource utilization factor, based on the prediction.

Various implementations of the device are described.

According to some implementations, the operations further comprise: generating a model adapted to predict a relationship between the resource utilization factor and the at least one metric; generating the prediction that associates the particular level of the resource utilization factor with a particular value of the at least one metric, based on the model; and adjusting the knob from the first setting to the second setting, based on the prediction.

According to some implementations, the at least one metric comprises a measure of one of: a frame rate, an update latency, a coherence level, a functional world available, a simulation level, a probability of a crash, and a memory management.

According to some implementations, the resource utilization factor comprises one of: a draw distance, a rendering resolution, an animation throttling, a view distance, a texture, a mesh fidelity, a video playback rate, a music and sound effect, a visual effect, a lighting fidelity, and a physics/animation throttling.

According to some implementations, the operations further comprise: defining a minimum value of the at least one metric; generating a prediction that the minimum value of the at least one metric is associated with the particular level of the resource utilization factor; and adjusting the knob from the first setting to the second setting associated with the particular level of the resource utilization factor, based on the prediction.

According to some implementations, the operations further comprise: defining a second resource utilization factor having a plurality of second levels corresponding to respective second amounts of resource utilization by the virtual experience system; defining a second knob having a plurality of second settings, each second setting corresponding to a respective second level of the second resource utilization factor; generating a second prediction that associates a particular second level of the second resource utilization factor with a particular value of the at least one metric; and adjusting the knob from a first second setting to a second second setting associated with the particular second level of the second resource utilization factor, based on the second prediction.

According to another aspect, a non-transitory computer readable medium has stored thereon software instructions that, when executed by a processor, cause the processor to execute a set of operations comprising: defining at least one metric associated with a user experience within a virtual experience managed by a server system; defining a resource utilization factor having a plurality of levels corresponding to respective amounts of resource utilization by the server system, the resource utilization relating to use of at least one of processing power, memory, or network bandwidth; defining a knob having a plurality of settings, each setting corresponding to a respective level of the resource utilization factor; generating a prediction that associates a particular level of the resource utilization factor with a particular value of the at least one metric; and adjusting the knob from a first setting to a second setting associated with the particular level of the resource utilization factor, based on the prediction.

Various implementations of the non-transitory computer readable medium are described.

According to some implementations, the at least one metric comprises a measure of one of: a frame rate, an update latency, a coherence level, a functional world available, a simulation level, a probability of a crash, and a memory management.

According to some implementations, the resource utilization factor comprises one of: a draw distance, a rendering resolution, an animation throttling, a view distance, a texture, a mesh fidelity, a video playback rate, a music and sound effect, a visual effect, a lighting fidelity, and a physics/animation throttling.

According to some implementations, the operations further comprise: defining a minimum value of the at least one metric; generating a prediction that the minimum value of the at least one metric is associated with the particular level of the resource utilization factor; and adjusting the knob from the first setting to the second setting associated with the particular level of the resource utilization factor, based on the prediction.

According to some implementations, the prediction indicates that at least one level of the resource utilization factor is associated with a predicted value of the at least one metric that is below a predetermined limit; the operations further comprising: adjusting the knob from the first setting to the second setting associated with the particular level of the resource utilization factor in order to reduce resource utilization and ensure that an actual value of the at least one metric does not fall below a predetermined limit, based on the prediction.

According to some implementations, the prediction indicates that at least one level of the resource utilization factor is associated with a predicted value of the at least one metric that is outside of a predetermined range; the operations further comprising: adjusting the knob from the first setting to the second setting associated with the particular level of the resource utilization factor in order to reduce resource utilization and ensure that an actual value of the at least one metric does not fall outside of the predetermined range, based on the prediction.

According to yet another aspect, portions, features, and implementation details of the disclosed systems, methods, apparatuses, devices, and non-transitory computer-readable media may be combined to form additional aspects, including some aspects which omit and/or modify some or portions of individual components or features, include additional components or features, and/or other modifications; and all such modifications are within the scope of this disclosure.

BRIEF DESCRIPTION OF DRAWINGS

FIGS. 5A-5D illustrate several example scenarios that may occur during a user experience within a virtual experience, in accordance with some implementations.

DETAILED DESCRIPTION

Figure 1:
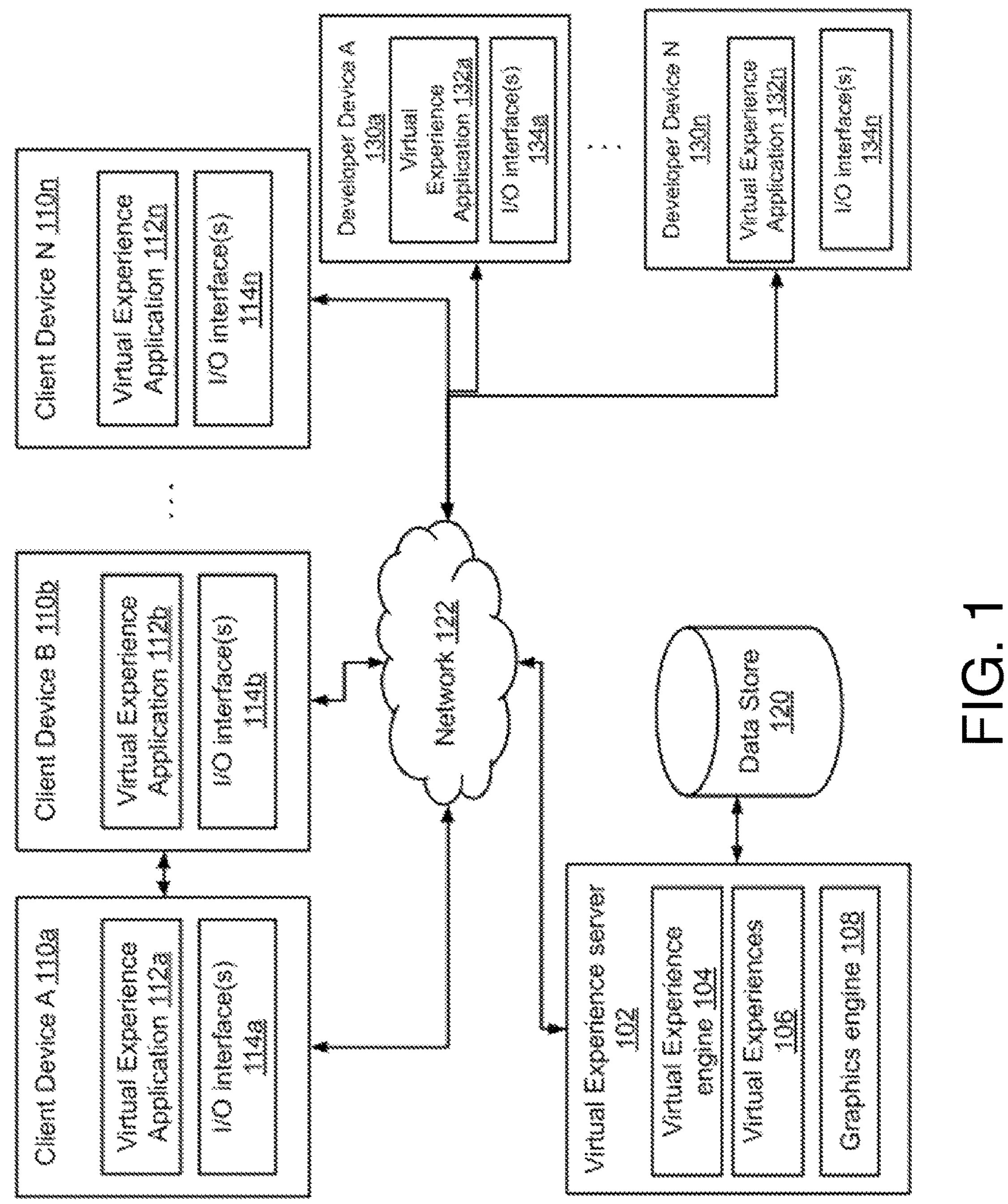
FIG. 1 is a diagram of an example system architecture for simulation of rigid body objects, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

A virtual experience is managed by a virtual experience system. The developers of a virtual experience strive to optimize the performance of the virtual experience system in order to provide the best possible experience for users. However, developers must often contend with a variety of elements that can adversely affect performance. Virtual experiences typically generate three-dimensional environments that can be detailed and require significant amounts of resources (including processing power and memory) to render in real time as a user moves through and interacts with the environment. Accordingly, one important determinant of performance of a virtual experience system is the availability at any particular moment of resources such as memory, processing power, and available bandwidth. High availability of such resources typically allows the virtual experience system to provide a high-quality experience for the user. Conversely, low availability of resources often reduces the quality of the user's experience.

More particularly, the quality of a user's virtual experience is directly affected by a variety of determinants such as frame rate, incidence of crashes, etc. Higher frame rates are associated with a higher quality experience; low frame rates can reduce the quality of the user's experience. Consistency is also important to ensure that a user does not experience an interrupted experience when the frame rate drops. Crashes are also very significant events that adversely affect a user's experience.

Some common problems result from the fact that many existing virtual experience systems do not monitor resources and the user's experience effectively and as a result can exacerbate problems that arise. For example, some systems may determine that memory is available and respond by streaming more content in, even though the frame rate is low. This can cause the frame rate to decrease even more, further reducing the quality of the user's experience.

Systems and methods described herein advantageously address these problems by orchestrating resource usage across systems, making it possible to optimize a virtual experience for every user regardless of the user's device. Advantageously, resources, as well as resource utilization factors associated with the availability and usage of resources, are monitored and managed in order to optimize a user's experience.

Advantageously, systems and methods described herein make it possible to adjust resource utilization within a virtual experience system in order to ensure a high quality user experience within a virtual experience. More particularly, a high quality user experience is ensured by adjusting presentation quality as far down as necessary and as high up as possible.

In some implementations, a virtual experience system adjusts resource utilization associated with a single user's virtual experience in order to ensure a high quality experience by the user. In some implementations, in which a plurality of users simultaneously participate in separate virtual experiences but share one or more resources, a virtual experience system may adjust the utilization of the shared resources in order to optimize the quality of all of the users' virtual experiences.

In some implementations, the quality of a user experience within a virtual experience is measured by one or more metrics. One or more resource utilization factors associated with usage of selected resources are defined, one or more metrics associated with various aspects of the user experience are defined, and one or more mappings defining relationships between the resource utilization factors and the metrics are generated. For example, a mapping indicating how changes to a particular resource utilization factor affects a particular metric may be generated.

In some implementations, each subsystem (rendering, simulation, animation, etc.) within a virtual experience system advantageously provides a set of "knobs" for executing tradeoffs between the virtual experience system's utilization of resources and the quality of a user's experience. Tradeoffs are identified and executed in order to optimize the quality of the user's virtual experience.

The term "knob" as used herein refers to a mechanism for adjusting or modulating one or more resource utilization factors. Each resource utilization factor is assigned a plurality of levels corresponding to respective amounts of resource usage. A knob associated with the resource utilization factor is defined to have a plurality of states, or settings, each corresponding to a respective level of the associated resource utilization factors. Accordingly, a knob may be associated with multiple resource utilization factors, with the resource utilization factors including a plurality of states or settings.

The terms "knob setting" and "knob state" are used interchangeably herein.

In some implementations, a set of one or more metrics reflecting the quality of a user's experience, and a set of one or more resource utilization factors associated with the availability and usage of resources are defined. Each metric has a plurality of possible values associated with respective levels of quality experienced by the user. Each resource utilization factor has a plurality of levels corresponding to respective amounts of resource usage. As a user explores the virtual experience, the resource utilization factors are monitored, and the metrics reflecting the quality of the user's experience are monitored. When it is determined that the quality of the user's experience can be improved or optimized by changing the levels of one or more resource utilization factors, then the resource utilization factors may be manipulated and adjusted to improve the user's experience.

In some implementations, one or more knobs adapted to adjust the levels of the resource utilization factors are defined. Each knob is associated with a respective resource utilization factor. Each knob has a plurality of states, or settings, associated with respective levels of the resource utilization factor. Accordingly, the knob can be "turned" from a first setting associated with a first level of the resource utilization factor to a second setting associated with a second level of the resource utilization factor. In this way, the knob can be turned from the first setting to the second setting to change the level of the resource utilization factor. Examples of possible knobs include a knob for draw distance, a knob for rendering resolution, a knob for animation throttling, etc. For example, a knob associated with draw distance may have a first setting associated with a first distance, a second setting associated with a second distance (different from the first distance), a third setting associated with a third distance, etc. Turning the knob from the first setting to the second setting changes the draw distance from the first distance to the second distance.

In some implementations, a knob corresponding to a resource utilization factor may be turned from a first setting to a second setting in accordance with a predetermined policy. For example, in some implementations, a knob corresponding to a resource utilization factor may be turned to adjust the resource utilization factor in a manner that reduces usage of an associated resource, in order to ensure that a selected metric remains within a predetermined range. In some implementations, a knob corresponding to a resource utilization factor may be turned to adjust the resource utilization factor in a manner that reduces usage of the associated resource, in order to ensure that a selected metric does not fall below a predetermined limit.

In some implementations, a prediction indicating how changes to a particular resource utilization factor may affect a particular metric may be generated, and a knob associated with the particular resource utilization factor may be turned from a first setting to a second setting based on the prediction. For example, in some implementations, a prediction may be generated indicating that at least one possible level of a particular resource utilization factor is associated with a predicted value of a corresponding metric that is below a predetermined limit. In response, a knob corresponding to the resource utilization factor may be adjusted from a first setting to a second setting in order to reduce usage of an associated resource and ensure that an actual value of the metric does not fall below a predetermined limit.

For example, in some implementations, a prediction may be generated indicating that at least one possible level of a particular resource utilization factor is associated with a predicted value of a corresponding metric that is outside of a predetermined range. In response, a knob corresponding to the resource utilization factor may be adjusted from a first setting to a second setting in order to reduce usage of an associated resource and ensure that an actual value of the metric does not fall outside of the predetermined range.

Examples of resource utilization factors include, without limitation, measures of memory, processing power, bandwidth, as well as other factors associated with resource usage such as measures of draw distance, rendering resolution, animation throttling, view distance, texture, mesh fidelity, video playback rate, music and sound effects, visual effects, lighting fidelity, physics/animation throttling, etc. Other factors may be used.

Examples of metrics associated with the quality of a user's experience in a virtual experience may include, without limitation, measures of frame rate, update latency, coherence, coordination, functional world available, simulation, probability of a crash occurring, etc. Other metrics may be used.

Frame rate, as used herein, may refer to the frequency of consecutive images that are displayed each second.

Update latency, as used herein, may refer to the frequency between updates made by the virtual experience system to a user's device.

Latency, as used herein, may refer to the amount of elapsed time between a user's input to the system and the corresponding response of the system. For example, the time between pressing a button on a controller and seeing and hearing a weapon fire, score increase, etc.

Coherence, as used herein, may refer to the state of the simulated world as perceived by the user matching the rules of the simulated space. For example, in a physically simulated game, breaking the legs of a chair should cause the rest of the chair to fall to the ground (instead of floating in the air or flying off into space).

Coordination, as used herein, may refer to the consistency of the multi-modal response of the game world to the user's input. For example, seeing and hearing all of the effects of an action such as opening a door. The door moves and playing a creaking sound at approximately the same time. In addition, gameplay effects such as being able to traverse through a doorway only when the door is open are applied correctly and in a timely way.

As used herein, the functional world may refer to the extent of the simulated environment that is simultaneously available to the user's senses (e.g., visible/audible) and responsive to user input (e.g., pushing, picking up, clicking, etc.).

Simulation quality, as used herein, may refer to the quality and believability of the simulation of real world behaviors, such as physical collisions between objects, visible and audible reactions to environmental interactions. For a complex example, driving a simulated car should respond to user input and the environment in a way that matches user expectations. Reducing simulation quality can result in artifacts such as objects moving through each other or exhibiting exaggerated responses to impacts, etc.

In some implementations, one or more metrics, and one or more policies, may be defined or selected by a user. Advantageously, allowing a user to select or define metrics and/or polices allows a virtual experience system that serves a plurality of users to optimize each user's virtual experience based on the respective user's preferences. For example, a first user may indicate that higher frame rate is more important than level of detail displayed, while a second user may indicate that a higher level of detail displayed is more important than a higher frame rate.

Accordingly, in some implementations, a virtual experience system may, for example, determine that resources have decreased and, in response, adjust the knob for draw distance to lower the draw distance, thus reducing the usage of resources. This adjustment to draw distance may free up resources and allow the system to provide a better quality experience for the user. When resources increase, the system may again adjust the knob for draw distance by increasing the draw distance.

In some implementations, a virtual experience system may be implemented by a system such as the system shown in FIG. 1.

FIG. 1: System Architecture

FIG. 1 is a diagram of an example system architecture for simulation of rigid body objects, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowcharts shown in the Figures. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, gameplay session data are generated via online virtual experience server 102, virtual experience application 112, and/or virtual experience application 132, and are stored in data store 120. With permission from game players, gameplay session data may include associated metadata, e.g., game identifier(s); device data associated with the players; demographic information of the player(s); gameplay session identifier(s); chat transcripts; session start time, session end time, and session duration for each player; relative locations of participant avatar(s) within a virtual game environment; in-game purchase(s) by one or more player(s); accessories utilized by game players; etc. Virtual experience server 102 may store other types of information in data store 120.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between players.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment, accessories utilized by game participants, etc. In some implementations, the chat transcripts may include multilingual content, and messages in different languages from different gameplay sessions of a game may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be a virtual experiences server. For example, the virtual experiences server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D)

games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a virtual experience (e.g., virtual experience 106) or the presentation of the interaction on a display or other output device (e.g., 114) of a client device 110.

In some implementations, a virtual experience 106 can include an electronic file that can be executed or loaded using software, firmware or hardware configured to present the game content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a virtual experience 106 may be collectively referred to as a "world" or "gaming world" or "virtual world" or "universe" herein. An example of a world may be a 3D world of a virtual experience 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "game objects" or "virtual game item(s)" herein) of virtual experiences 106.

For example, in generating user-generated virtual items, users may create characters, decoration for the characters, one or more virtual environments for an interactive game, or build structures used in a virtual experience 106, among others. In some implementations, users may buy, sell, or trade game virtual game objects, such as in-platform currency (e.g., virtual currency), with other users of the online virtual experience server 102. In some implementations, online virtual experience server 102 may transmit game content to virtual experience applications (e.g., 112). In some implementations, game content (also referred to as "content" herein) may refer to any data or software instructions (e.g., game objects, game, user information, video, images, commands, media item, etc.) associated with online virtual experience server 102 or virtual experience applications. In some implementations, game objects (e.g., also referred to as "item(s)" or "objects" or "virtual objects" or "virtual game item(s)" herein) may refer to objects that are used, created, shared or otherwise depicted in virtual experience applications 106 of the online virtual experience server 102 or virtual experience applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the game platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private game), or made widely available to users with access to the online virtual experience server 102 (e.g., a public game). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the game (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two game objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on gameplay conditions. For example, if the number of users participating in gameplay of a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send gameplay instructions (e.g., position and velocity information of the characters participating in the group gameplay or commands, such as rendering commands, collision commands, etc.) to the client devices 110 based on control instructions. For instance, the online virtual experience server 102 may perform one or more logical operations (e.g., using virtual experience engine 104) on the control instructions to generate gameplay instruction(s) for the client devices 110. In other instances, online virtual experience server 102 may pass one or more or the control instructions from one client device 110 to other client devices (e.g., from client device 110*a* to client device 110*b*) participating in the virtual experience 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates gameplay instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that enable a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online gaming platform may provide users access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that in some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other game objects, virtual experiences 106, or game environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online virtual experience server 102 may store characters created by users in the data store 120. In some implementations, the online virtual experience server 102 maintains a character catalog and game catalog that may be presented to users. In some implementations, the game catalog includes images of games stored on the online virtual experience server 102. In addition, a user may select a character (e.g., a character created by the user or other user) from the character catalog to participate in the chosen game. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application may be an online virtual experiences server application for users to build, create, edit, upload content to the online virtual experience server 102 as well as interact with online virtual experience server 102 (e.g., play virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 130 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an online virtual experiences server application for users to build, create, edit, upload content to the online virtual experience server 102 as well as interact with online virtual experience server 102 (e.g., provide and/or play virtual experiences 106 hosted by online virtual experience server 102). As such, the virtual experience application may be provided to the client device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a game developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (APIs), and thus is not limited to use in websites.

Figure 2:
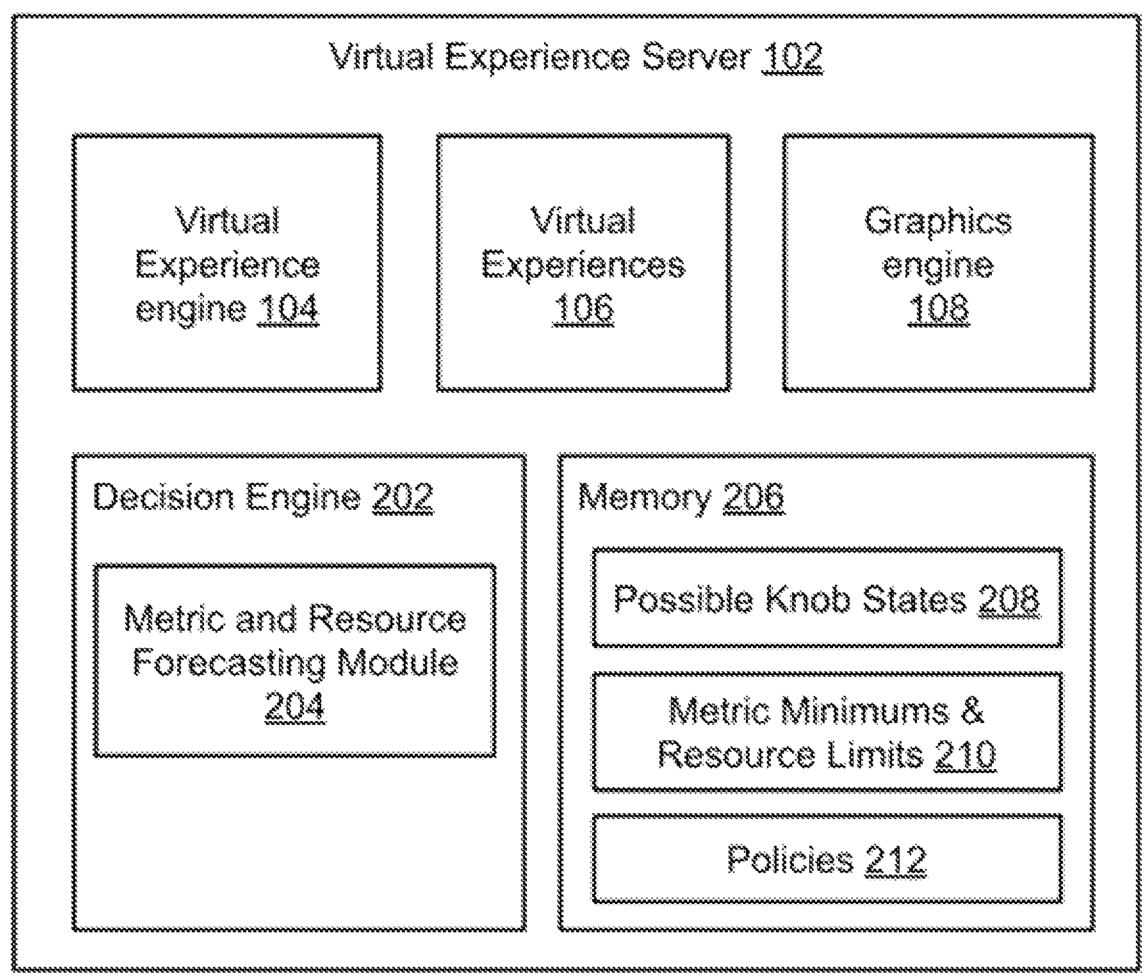
FIG. 2 illustrates components of a virtual experience server, in accordance with some implementations.

FIG. 2: Virtual Experience Server

FIG. 2 illustrates components of a virtual experience server, in accordance with some implementations. Virtual experience server 102 includes virtual experience engine 104, virtual experiences 106, and graphics engine 108, which are shown in FIG. 1. Virtual experience server 102 also includes decision engine 202 and a memory 206. Memory 206 is adapted to store data. Virtual experience server 102 may store data in memory 206.

In some implementations, decision engine 202 is adapted to analyze levels of one or more resource utilization factors, and the values of one or more metrics relating to the quality of a user's experience within a virtual experience and, in response, determine and implement a course of action. For example, decision engine 202 may adjust the level of one or more resource utilization factors in order to affect the value of the one or more metrics.

In some implementations, decision engine 202 measures quality from a user's perspective. Accordingly, one or more metrics may be defined to capture the various aspects of the user's experience as perceived by the user.

In some implementations, the impact of a single knob adapted to adjust a particular resource utilization factor on one or more metrics may be impossible to compute in isolation.

In some implementations, performance is determined by bottlenecks, such as central processing unit (CPU) threads, graphics processing unit (GPU) threads, etc. Render perform time, as used herein, refers to the time spent submitting rendering tasks to the GPU as well as time spent waiting on the GPU to complete its work and display a new image to the user. For example, render perform time, under some circumstances, may only affect frames per second (FPS) if the frame is limited by render perform time.

In some implementations, decision engine 202 may maintain a set of internal measures, with which the plurality of knobs are correlated, and may convert the internal measures into the end metrics. For example, one or more knobs may correlate to a CPU Perform Thread Time internal measure; this knob and others may affect the final value of an FPS metric.

CPU Perform Thread Time, as used herein, may refer to the time spent in a frame doing everything not directly related to drawing to the screen. Such actions may include playing sounds, simulating physics, applying animation, and so on.

Frames per second, or FPS, may refer to the number of distinct images displayed to the user every second. A higher FPS can correspond with a more responsive and believable visual experience.

In some implementations, decision engine 202 defines knobs and knob states with the objective of creating a dynamic system that can be driven to a desired objective at steady state, while avoiding oscillations and minimizing delay. This is achieved by driving controls and observing results. Constrained optimization may be achieved by modeling one or more correlations, including approximation of gradients, taking into consideration any hard constraints. For example, models are introduced that predict the correlation between each knob state and related metric. In addition, each metric is given a utility function that determines its relative impact to the user experience. These models and utility functions can be built by hand, or continuously updated from observations, using runtime sampling or offline machine learning. The decision engine then uses a gradient descent process to set knob states that improves or maximizes the overall utility, given the current metric values and previous knob states. Other variations may also be applicable.

Other elements relevant to the process of defining knobs and knob states include discrete controls, "A/B/testing," and performing shard tests across the user population.

Discrete controls, as referred to herein, may allow direct manipulation of knobs by implementors in order to fine tune the knob behavior and associated models.

A/B testing, as used herein, refers to a the process by which a change in any aspect of this system is deployed to a subset of users (i.e., a treatment group) so that outcomes can be measured in comparison to the remaining users and the prior behavior (i.e., the control group). This approach may allow for factoring out changes in outcome that are not the result of the changes being tested.

Shard tests, as referred to herein, include a variant of A/B testing that focuses on splitting treatment and control groups on factors such as device used, geographic location, and/or other factors.

Metrics can be relatively challenging to evaluate. Some metrics are not knowable analytically.

In some implementations, decision engine 202 may use machine learning to learn from data and improve its ability to make the best choices. For example, a machine learning model may convert a vector of features into a score. Decision engine 202 may gather telemetry and data. The gathered telemetry and data may include measurements of resource utilization and knob state(s) as well as other factors of the interactive session and user device that are known to correlate with resource usage. In addition, telemetry related to user engagement can be used to model the impact on the resource metrics on user satisfaction.

In some implementations, decision engine 202 may employ a per-user model based on an identification of choices that lead to the most playtime. In a per-user model use-case, users may specify personal preferences that impact the weighting supplied by the utility functions in order to prioritize knobs based on their importance to the user. For example, a particular user may want to prioritize visual over audible qualities or vice versa. Other use cases may also be applicable.

In some implementations, decision engine 202 may crowd-source device/place tuning implicitly by allowing user overrides. In a crowd-sourcing use case, users may provide preference overrides that are specific to the experience they are enjoying, or more generally applicable to the capabilities of the device they are playing on, which are gathered as crowd sourced data. These overrides can be analyzed in order to provide better default settings specific to certain devices and experiences.

In some implementations, decision engine 202 may determine a course of action based on one or more predefined policies. For example, decision engine 202 may analyze levels of one or more resources and/or the levels of one or more resource utilization factors, and the values of one or more metrics relating to the quality of a user's experience within a virtual experience and, based on one or more policies, determine and implement a course of action. In some implementations, one or more policies 212 may be stored in memory 206 as policies 212.

In some implementations, decision engine 202 uses or generates one or more predictions indicating how various levels of one or more resource utilization factors, and/or changes to such factors, may impact the values of one or more metrics relating to the quality of a user's experience in a virtual experience. Decision engine 202 may turn a selected knob in response to a prediction and in accordance with a predetermined policy.

For example, in some implementations, a policy may stipulate that a particular metric must not fall below a predetermined limit. A prediction may be generated indicating that at least one possible level of a resource utilization factor is associated with a predicted value of the particular metric that is below a predetermined limit. In response, a knob corresponding to the resource utilization factor may be adjusted from a first setting to a second setting in order to reduce usage of an associated resource and ensure that an actual value of the metric does not fall below the predetermined limit.

For example, in some implementations, a policy may stipulate that a particular metric must remain within a predetermined range. A prediction may be generated indicating that at least one possible level of a particular resource utilization factor is associated with a predicted value of the metric that is outside of the predetermined range. In response, a knob corresponding to the resource utilization factor may be adjusted from a first setting to a second setting in order to reduce usage of an associated resource and ensure that an actual value of the metric does not fall outside of the predetermined range.

In some implementations, decision engine 202 may include and/or use one or more models adapted to generate predictions concerning how resource utilization factors affect various metrics. For example, in some implementations, decision engine 202 includes a metric and resource forecasting model 204. Metric and resource forecasting model 204 generates forecasts and/or predictions indicating relationships between levels of various resource utilization factors and one or more metrics relating to the quality of a user's experience in a virtual experience. For example, metric and resource forecasting model 204 may generate predictions indicating how various levels of, or changes to, one or more resource utilization factors may increase or decrease the values of one or more metrics.

In some implementations, metric and resource forecasting model 204 may include, or may generate, a model indicating a relationship between a particular resource utilization factor and a particular metric associated with the quality of a user's experience in a virtual experience.

In some implementations, metric and resource forecasting model 204 may include a machine learning model adapted to predict how levels of, or changes to, one or more resource utilization factors may affect the values of one or more metrics relating to the quality of a user's experience.

In some implementations, decision engine 202 may monitor or receive information relating to current estimates of resource limits, metrics and priorities that define levels of quality of a user experience in a virtual experience (e.g., high quality, medium quality, low quality, or enjoyable, not enjoyable) and/or levels of presentation quality (e.g., high, medium, low), minimum requirements for one or more metrics, available knobs and possible settings for each knob, etc.

In some implementations, the quality of a user's virtual experience may be measured or monitored using one or more metrics, which may include measures of, without limitation, frame rate, update latency (time between server action and when a user sees the action), coherence/coordination (e.g., animation/audio sync during a concert), functional world available, simulation (frame rate, throttling, sim radius, etc.), memory management, bandwidth, an asset quality score, and a probability of a streaming pause. Values indicating measures of various metrics at various times may be determined and stored.

Throttling, as used herein, may refer to limiting the rate at which updates to the simulation occur in order to constrain resource usage. For example, a physical object may calculate collisions and physical impulses at a rate that is lower than the frame rate. This indicates that some frames will either not show the object moving, or show it moving using a simple extrapolation of previous motion, while other frames will adjust the object position based on collisions, etc.

Sim radius, as used herein, may refer to the distance from the user's location in the simulated world where objects are simulated locally on the user's device, providing lower latency at the cost of increased resource usage.

An asset may refer to the discrete components of the simulated scene (e.g., 3D geometry and imagery, sound effects, animations, etc.). Each of these assets can be provided in multiple levels of detail, requiring varying degrees of resource consumption to contribute to the simulated scene. For example, multiple representations of a piece of 3d geometry may be selected individually to balance visual fidelity with resource constraints. Accordingly asset quality score may refer to a quality based on utilized assets.

In some implementations, decision engine 202 is adapted to monitor one or more resource utilization factors associated with availability of resources, and adjust one or more of the factors based on one or more predetermined policies. One or more policies may be established with a goal of improving or optimizing the quality of a user's experience.

In some implementations, respective knobs may be defined for factors such as draw distance, rendering resolution, animation throttling, etc. Knobs may be also defined for factors associated with presentation quality including, without limitation, view distance, texture or texture fidelity, mesh fidelity, video playback rate, music and sound fx (placed and emergent), visual effects, lighting fidelity, physics/animation throttling, stream GC radius, asset loader level, FRM level, etc. Knobs may be defined for other factors.

As used herein, draw distance is the maximum distance of objects in a three-dimensional scene that are rendered.

As used herein, rendering resolution refers to the total number of pixels in an image under some scenarios. Furthermore, in some scenarios, rendering resolution may also refer to the total number of pixels rendered (i.e., an actual rendering resolution), while display resolution may refer to the total number of pixels displayed (i.e., an actual display resolution). In some implementations, a resampling or upscaling process may be utilized to convert a low resolution render image to a higher resolution display image.

As used herein, animation throttling may refer to controlling the rate at which animation data is used to update the position of objects or pieces of objects in the scene. For example, an animation of a human character waving their arm might only apply the updates to their arm position and rotation once every few rendered frames, in order to reduce resource usage.

As used herein, view distance may be equivalent to a draw distance.

Textures, as used herein, may refer to images applied to the exterior of a 3d object to give it the illusion of surface detail.

As used herein, texture refers to the characteristics of a surface of a rendered object. The texture factor may be defined to have a plurality of levels, each level associated with a respective level of detail of the surface characteristics that are displayed. For example, a first level of the texture factor may correspond to a low level of detail of the surface characteristics displayed (or no detail displayed), wherein a second level may correspond to a high level of detail of the surface characteristics displayed.

As used herein, mesh fidelity may refer to the ability to have varying representations of 3D geometry with differing levels of approximation of the surface being represented. Much like using more pixels to describe an image results in a higher fidelity representation, using more triangles to approximate a 3d surface does as well.

As used herein, video playback rate is the rate at which media is played back. Video playback rate can also be expressed in frames per second (e.g., how many frames of the original video are shown per second of time, up to a maximum determined by the video contents).

As used herein, music and sound fx may refer to typical or conventional "effects" as used in production terminology for television, motion picture, and other similar productions. This may include the natural interpretation of those words (as used in radio, TV, and movies) where the music and sound effects might be playing as part of the overall ambiance of the experience, or triggered by gameplay. The fidelity level may refer to the resolution of playback and degree of compression of each piece of music/sound effect.

As used herein, visual effects may refer to visuals modification to the normal **3*d*** scenery of an experience, such as approximations of fluid and gaseous effects such as flashes, explosions, fire, smoke, sparks, etc. as well as other forms of visual variety involving light and shadow (e.g., rainbows, "halos" around light sourced, etc.).

As used herein, lighting fidelity may refer to the quality of approximation of the way light propagates from light sources (e.g., light fixtures, fire, the sun) and/or bounces around the environment and ultimately enters your eye. Calculating the actual behavior of photons is very resource intensive and thus approximations can be utilized to approximate a qualitatively similar effect. Different approximations can be used to balance realism with resource usage.

As used herein, animation may refer to application of predefined motions and physics may refer to the simulated kinetic behavior of 3D objects. Each source of motion can be applied together or separately and at independent rates determined by the separate physics and animation throttling behaviors. Accordingly, animation throttling and physics throttling may be applied independently, in combination, and/or in some implementations, linked together.

Each resource utilization factor has a plurality of levels associated respectively with different amounts of resource utilization. For example, the draw distance factor may have a first level associated with a first distance and a first amount of resource utilization, a second level associated with a second distance and a second amount of resource utilization, a third level associated with a third distance and a third amount of resource utilization, etc.

In some implementations, decision engine 202 adjusts one or more knobs in order to achieve one or more objectives, or in accordance with one or more policies. For example, decision engine 202 may adjust one or more knobs in order to ensure that at least the minimum acceptable quality level for each metric is met. Decision engine 202 may adjust one or more knobs to ensure that the overall quality of a user's experience is optimized, or to ensure that unconstrained resource usage is avoided or limited, or to provide a graceful exit from a user's experience if needed in order to avoid a hard crash, etc.

As used herein, "graceful exit" may refer to removing the user from the virtual experience and putting the virtual experience application back in a known state. Such a graceful exit may include an explanation of what happened and allow a user to select a different virtual experience.

In some implementations, minimum specified levels for one or more metrics are stored in memory 206 in metric minimums and resource limits 210. Decision engine 202 may adjust one or more knobs to ensure that the value of each metric does not fall below the relevant minimum specified level.

In some implementations, decision engine 202 may adjust selected knobs as necessary to ensure that minimum specified values are met for all metrics. Thus, for example, decision engine 202 may adjust the knobs for video playback rate (to lower the video playback rate, thus reducing resource usage) and/or adjust the knob for lighting fidelity (to reduce lighting fidelity, thus reducing resource usage) in order to ensure that minimum specified values are met for selected metrics (such as, for example, frame rate, update latency, coherence/coordination, etc.)

Figure 3:
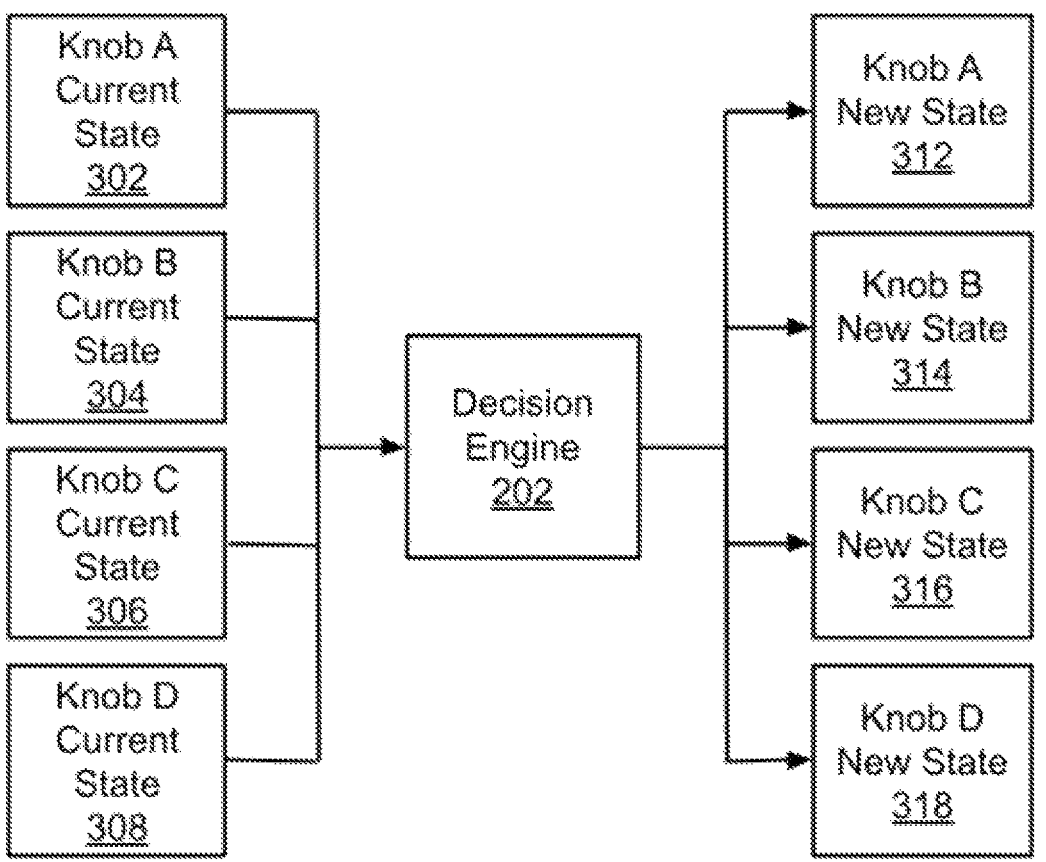
FIG. 3 illustrates a function of a decision engine, in accordance with some implementations.

FIG. 3: Knob Adjustment

FIG. 3 illustrates a function of decision engine 202 in accordance with some implementations. Decision engine 202 receives information indicating the states of knobs A, B, C, and D. Specifically, decision engine 202 receives information indicating that these knobs have knob A current state 302, knob B current state 304, knob C current state 306, and knob D current state 308, respectively. Decision engine 202 also receives information concerning the quality of a user's experience within a virtual experience. In particular, decision engine 202 receives information concerning one or more metrics. Decision engine 202 may access one or more models or predictions indicating a relationship between the resource utilization factors and one or more metrics. Decision engine 202 may also examine one or more policies, specified metric minimum values, and specified resource limits. Based on the current values of the metrics, the current levels of the resource utilization factors, the one or more policies, any relevant limits, and one or more models and/or predictions, decision engine 202 may determine that, in order to improve or optimize the quality of a user's virtual experience, or to satisfy an applicable policy, it is necessary to change the states of the knobs A, B, C, and D to knob A new state 312, knob B new state 314, knob C new state 316, and knob D new state 318, respectively. Accordingly, decision engine 202 adjusts knobs A, B, C, and D to the new states.

Figure 4:
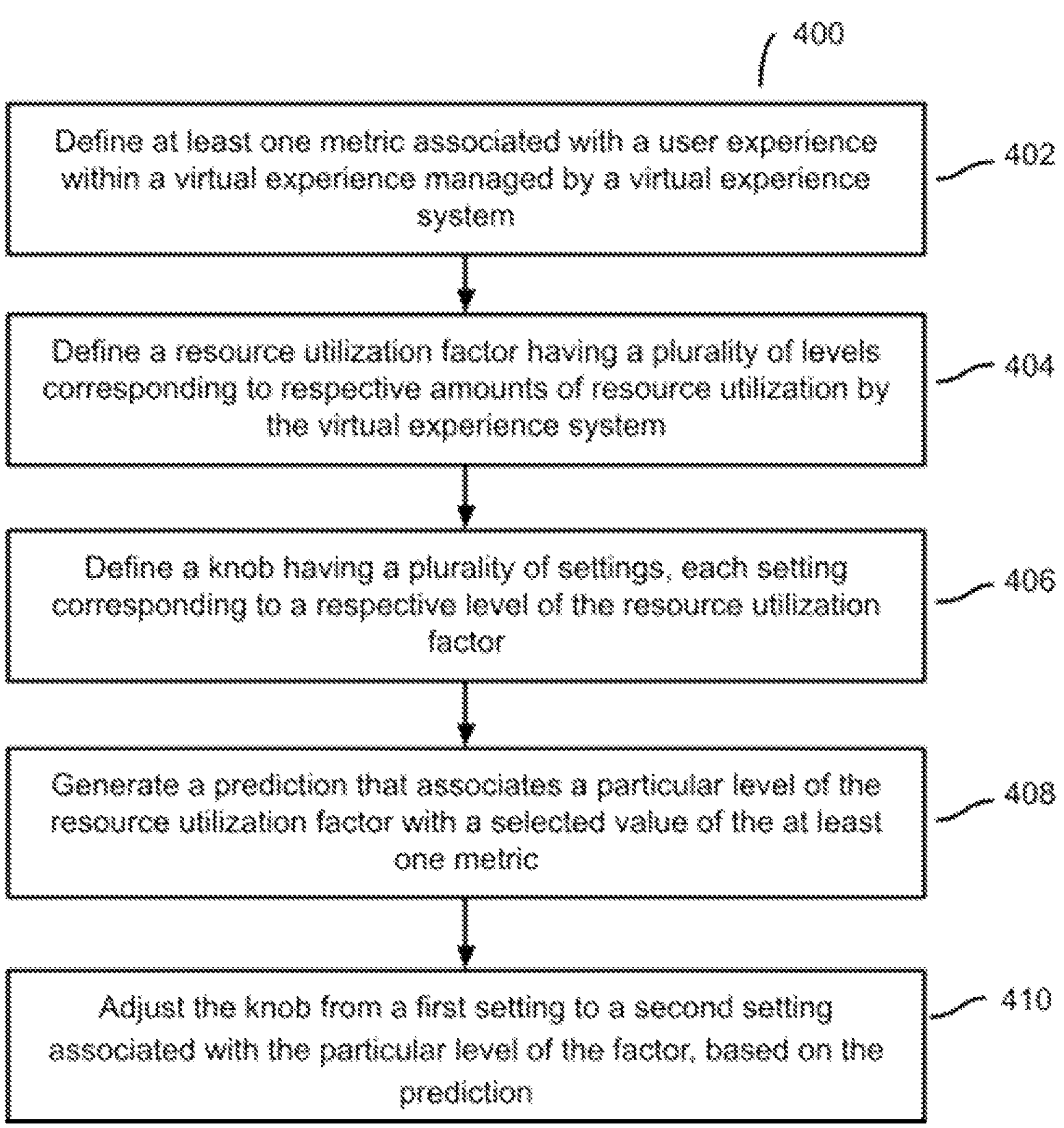
FIG. 4 depicts a method of adjusting one or more knobs based on predictions, in accordance with some implementations.

FIG. 4: Method of Adjusting Knobs Based on Predictions

FIG. 4 depicts a method of adjusting one or more knobs based on predictions in accordance with some implementations.

At block 402, at least one metric associated with a user experience within a virtual experience managed by a virtual experience system is defined. Decision engine 202 defines one or more metrics associated with the quality of a user's experience within a virtual experience. Examples of metrics include, without limitation, measures of frame rate, update latency, coherence level, functional world available, simulation level, and memory management. In some implementations, each metric has a range of possible values. In an illustrative example, suppose that decision engine 202 defines a metric to be a measure of frame rate.

Block 402 may be followed by block 404. At block 404, a resource utilization factor having a plurality of levels corresponding to respective amounts of resource utilization by the virtual experience system is defined. Thus, decision engine 202 defines a resource utilization factor. The resource utilization factor may be associated with usage of memory, processing power, bandwidth, or another resource. Examples of resource utilization factors include, without limitation, memory, processor usage, bandwidth, draw distance, rendering resolution, animation throttling, view distance, texture, mesh fidelity, video playback rate, music and sound effect, visual effect, lighting fidelity, and physics/animation throttling. In the illustrative example, suppose that decision engine 202 defines a resource utilization factor to be rendering resolution.

Block 404 may be followed by block 406. At block 406, a knob having a plurality of states is defined, each state corresponding to a respective level of the resource utilization factor. Decision engine 202 defines a knob associated with the resource utilization factor. The knob has a plurality of states. In the illustrative example, decision engine 202 defines a knob associated with rendering resolution. The knob may have a plurality of states associated with respective levels of rendering resolution, e.g., high resolution, medium resolution, low resolution, etc. Block 406 may be followed by block 408.

Block 406 may be followed by block 408. At block 408, a prediction that associates a particular level of the resource utilization factor with a selected value of the at least one metric is generated. In the illustrative example, decision engine 202 generates a prediction that associates a particular level of rendering resolution with a selected value of the frame rate metric. For example, the prediction may indicate that lowering the rendering resolution from a first level to a second level would increase the frame rate from a first value to a second value.

Block 408 may be followed by block 410. At block 410, the knob is adjusted from a first state to a second state associated with the particular level of the resource utilization factor, based on the prediction. Accordingly, in the illustrative example, decision engine 202 lowers the rendering resolution knob from the first state to the second state.

In some implementations, a plurality of metrics may be defined, and a plurality of resource utilization factors may be defined. Knobs may be defined for each of the resource utilization factors. One or more predictions may be generated indicating that adjusting a plurality of the resource utilization factors in a specified manner would change a plurality of the metrics to more desirable values. Decision engine 202 may accordingly adjust the corresponding knobs to cause the specified changes in the resource utilization factors, based on the prediction.

In some implementations, decision engine 202 uses a model and/or prediction that analyzes different possible levels of one or more resource utilization factors and generates a probability that particular changes to the factors will result in a given value of a selected metric. For example, supposing that it is determined to be desirable to achieve a particular value of a selected metric, decision engine 202 may use a model indicating that a first set of changes to the resource utilization factors has a 10% chance of resulting in the desired value of the selected metric, a second set of changes to the factors has a 30% chance of resulting in the desired value of the selected metric, and a third set of changes to the factors has a 60% chance of resulting in the desired value of the selected metric. Based on the predictions, decision engine 202 may implement the third set of changes in order to maximize the chance that the desired value will be achieved.

FIGS. 5A-5D: Example Scenarios

FIGS. 5A-5D illustrate several example scenarios that may occur while a user participates in a virtual experience within a virtual experience system in accordance with some implementations.

In one example, a user is playing in a streaming-enabled virtual experience. After playing for a while, many instances of the world are loaded. As a result, frame rate is degrading. Decision engine 202 may define three resource utilization factors—an FRM factor, a stream GC radius factor, and an asset loader factor.

As used herein, FRM refers to a frame rate manager which manages frame rate. The FRM may manage the resource of frame rate by tweaking and/or adjusting rendering features. The FRM may be a system that manages which rendering features are enabled and at what fidelity level they operate. In some implementations, the decision engine 202 manages framerate by subsuming control over the FRM.

As used herein, "stream radius" refers to the distance from the user at which objects are loaded and available to simulate, render, and interact with. It is complementary to factors like "draw distance" such that the distance at which the user can see objects in the scene is the minimum of draw distance and stream distance.

As used herein, the asset loader refers to the mechanism that fetches assets from the local disk or remote servers and puts them into the devices memory such that they can be added to the experience. The factor can refer to the rate at which assets are fetched, constrained by the throughput limitations of the user's disk (for assets stored there) or network connection (for assets stored remotely).

In some implementations, decision engine 202 may operate in accordance with one or more policies defining which trade-offs should be made in order to optimize the quality of a user's experience within a virtual experience. For example, a policy may stipulate that one or more selected metrics should be prioritized over other metrics. For example, a policy may stipulate that one or more metrics must never fall below a minimum level. For example, a policy may stipulate that one or more selected resource utilization factors may be adjusted within a first specified range in order to ensure that a selected metric remains within a second specified range.

In some implementations, decision engine 202 may follow a policy stipulating that one or more resource utilization factors may be adjusted in order to minimize the probability that the user will experience a streaming pause. A policy may include additional stipulations, such as that a particular resource utilization remains within a specified range or does not exceed or fall below a specified limit.

In some implementations, decision engine 202 generates one or more predictions concerning how resource utilization factors may impact one or more metrics and makes decisions in accordance with one or more policies. For example, in some implementations, decision engine 202 may generate one or more predictions indicating how one or more resource utilization factors may impact the probability that a user may experience a streaming pause, and select a course of action based on the prediction and one or more policies.

FIG. 5A shows a set of predictions in accordance with some implementations. More particularly, FIG. 5A shows a table 520 including a set of predictions indicating how levels of FRM, stream GC radius, asset loader, frame rate per second (FPS), and random access memory (RAM) may impact the probability of a streaming pause. Specifically, the prediction predicts that (as shown in row 522) if FRM level is 3, stream GC radius is 512, asset loader is zero, and FPS is 33, and RAM is 2.2 GB, then the probability that the user will experience a streaming pause is 25%. The prediction predicts that (as shown in row 524) if FRM level is 5, stream GC radius is 2048, asset loader is 10, and FPS is 28, and RAM is 3.0 GB, then the probability that the user will experience a streaming pause is 1%. The prediction predicts that (as shown in row 526) if FRM level is 5 stream GC radius is 1024, asset loader is 10, and FPS is 32, and RAM is 2.8 GB, then the probability that the user will experience a streaming pause is 2%. The prediction predicts that (as shown in row 528) if FRM level is 5, stream GC radius is 512, asset loader is 10, and FPS is 34, and RAM is 2.4 GB, then the probability that the user will experience a streaming pause is 25%.

In some implementations, decision engine 202 may compare the various scenarios and probabilities predicted and select a set of levels of the resource utilization factors based on a predetermined policy. Based on the predictions, decision engine 202 may adjust knobs corresponding to FRM level, stream GC radius, asset loader, and FPS to increase or decrease the FRM level, stream GC radius, asset loader, and FPS, respectively, in order to achieve a desired objective.

For example, supposing that decision engine 202 pursues a policy to minimize the probability of a streaming pause while ensuring that the frame rate remains above 30 FPS, then decision engine 202 may select the set of levels specified in row 426 (indicated in bold in FIG. 5A). Accordingly, decision engine 202 may adjust a set of corresponding knobs in order to change the set of factors to the desired levels.

In some implementations, decision engine 202 may generate one or more predictions indicating how one or more resource utilization factors may impact the asset quality score (and under some circumstances also impact the FPS, RAM, and asset quality score), and select a course of action based on the predictions and one or more policies.

FIG. 5B shows a set of predictions in accordance with some implementations. More particularly, FIG. 5B shows a table 540 including a set of predictions indicating how FRM level, stream GC radius, asset loader, frame rate, and RAM may impact an asset quality score. The prediction predicts that (as shown in row 542) if FRM level is 13, stream GC radius is 512, asset loader is zero, FPS is 100, and RAM is 2.2 GB, then the asset quality score will be 2. The prediction predicts that (as shown in row 544) if FRM level is 17, stream GC radius is 4096, asset loader is 300, FPS is 71, and RAM is 7.6 GB, then the asset quality score will be 80. The prediction predicts that (as shown in row 546) if FRM level is 17, stream GC radius is 4096, asset loader is 400, FPS is 68, and RAM is 8.2 GB, then the asset quality score will be 90. The prediction predicts that (as shown in row 548) if FRM level is 17, stream GC radius is 4096, asset loader is 500, FPS is 62, and RAM is 9.0 GB, then the asset quality score will be 100.

In some implementations, decision engine 202 may compare the various scenarios and asset quality scores predicted and select a set of levels of the resource utilization factors based on a policy. For example, supposing that decision engine 202 pursues a policy to maximize the asset quality score, then decision engine 202 may select the set of levels specified in row 448 (indicated in bold in FIG. 5B). Accordingly, decision engine 202 may adjust a set of corresponding knobs in order to change the set of factors to the desired levels.

In some implementations, decision engine 202 may generate one or more predictions indicating how one or more resource utilization factors may impact bandwidth, and select a course of action based on the predictions and one or more policies.

Figure 5C:
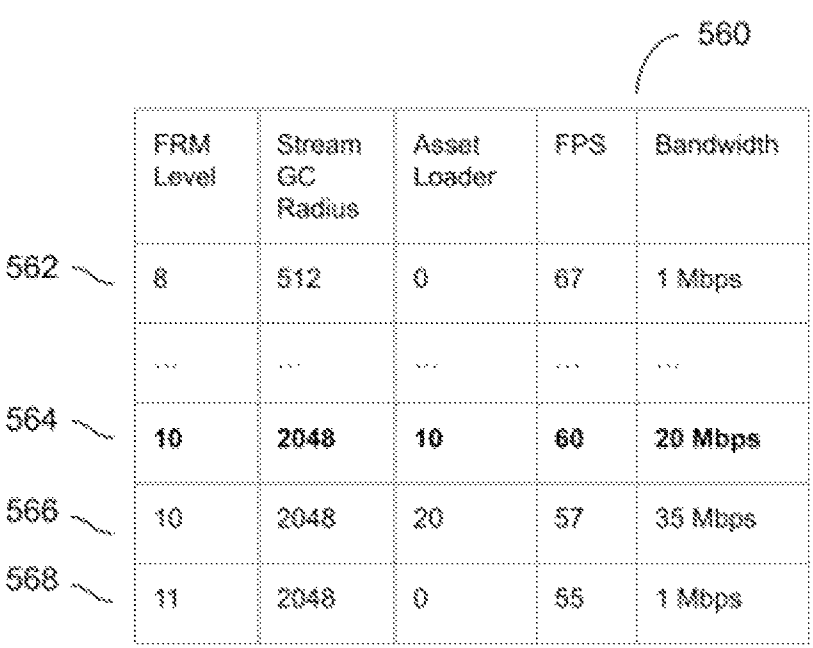

FIG. 5C shows a set of predictions in accordance with some implementations. More particularly, FIG. 5C shows a table 560 including a set of predictions indicating how FRM level, stream GC radius, asset loader, and frame rate may impact bandwidth. The prediction predicts that (as shown in row 562) if FRM level is 8, stream GC radius is 512, asset loader is zero, and FPS is 67, then bandwidth will be 1 Mbps. The prediction predicts that (as shown in row 564) if FRM level is 10, stream GC radius is 2048, asset loader is 10, and FPS is 60, then the bandwidth will be 20 Mbps. The prediction predicts that (as shown in row 566) if FRM level is 10, stream GC radius is 2048, asset loader is 20, and FPS is 57, then the bandwidth will be 35 Mbps. The prediction predicts that (as shown in row 568) if FRM level is 11, stream GC radius is 2048, asset loader is 0, and FPS is 55, then bandwidth will be 1 Mbps.

In these and other examples, the system does not attempt to maintain a set of mapping of all unique combinations of knob values to a set of resource utilization factors. Instead, the system is configured to leverage the sparsity and separability of this table, meaning that not all knobs affect all resource utilization factors and, more generally, most knobs affect by increments that are independent of what all other knobs are set to. For example, increasing stream radius from 512 to 1024 might add 5 Mbps to bandwidth, independent of the current bandwidth utilization and all other knob values. Other variations may also be applicable.

In some implementations, decision engine 202 may compare the various scenarios and bandwidth levels predicted and select a set of levels of the resource utilization factors based on a policy. For example, supposing that decision engine 202 pursues a policy to maximize bandwidth while only allowing moderate asset loading (less than 25), then decision engine 202 may select the set of levels specified in row 464 (indicated in bold in FIG. 5C). Accordingly, decision engine 202 may adjust a set of corresponding knobs in order to change the set of factors to the desired levels.

In some implementations, decision engine 202 may generate one or more predictions indicating how one or more resource utilization factors may impact the asset quality score, and select a course of action based on the predictions and one or more policies.

Figure 5D:
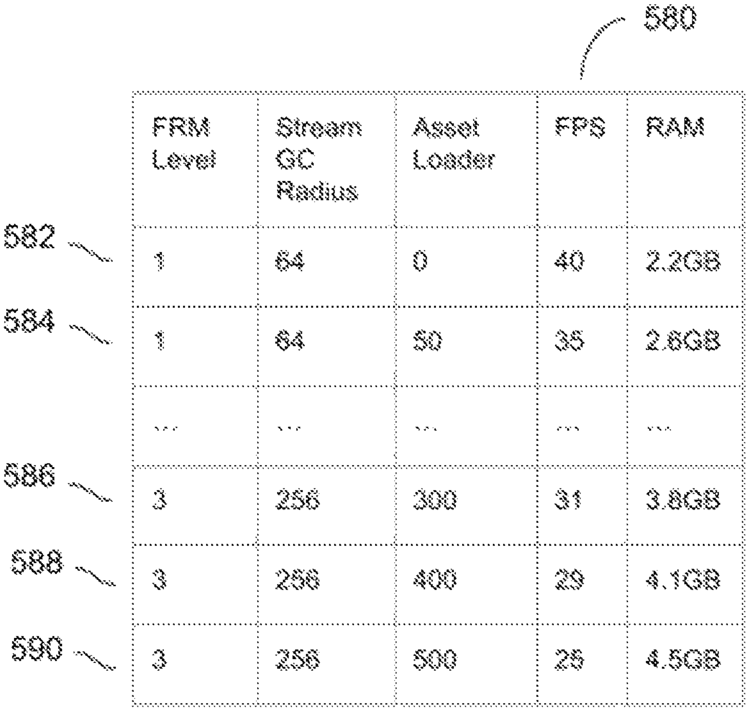

FIG. 5D shows a set of predictions in accordance with some implementations. More particularly, FIG. 5D shows a table 580 including a set of predictions indicating how FRM level, stream GC radius, asset loader, and frame rate may impact RAM. The prediction predicts that (as shown in row 582) if FRM level is 1, stream GC radius is 64, asset loader is zero, and FPS is 40, then RAM will be 2.2 GB. The prediction predicts that (as shown in row 584) if FRM level is 1, stream GC radius is 64, asset loader is 50, and FPS is 35, then RAM will be 2.6 GB. The prediction predicts that (as shown in row 586) if FRM level is 3, stream GC radius is 256, asset loader is 300, and FPS is 31, then RAM will be 3.8 GB. The prediction predicts that (as shown in row 588) if FRM level is 3, stream GC radius is 256, asset loader is 400, and FPS is 29, then RAM will be 4.1 GB. The prediction predicts that (as shown in row 590) if FRM level is 3, stream GC radius is 256, asset loader is 500, and FPS is 25, then RAM will be 4.5 GB.

In these and other examples, the system does not attempt to maintain a set of mapping of all unique combinations of knob values to a set of resource utilization factors. Instead, the system is configured to leverage the sparsity and separability of this table, meaning that not all knobs affect all resource utilization factors and, more generally, most knobs affect by increments that are independent of what all other knobs are set to. For example, increasing stream radius from 512 to 1024 might add 5 Mbps to bandwidth, independent of the current bandwidth utilization and all other knob values. Other variations may also be applicable.

In some implementations, decision engine 202 may compare the various scenarios and RAM predicted and determine a course of action based on a policy. For example, supposing that decision engine 202 pursues a policy to ensure that RAM must not exceed 2.0 GB, then decision engine 202 may determine that all options shown in Table 480 violate resource limits (specifically, that RAM must not exceed 2.0 GB. Decision engine 202 may accordingly initiate a graceful exit for the user.

Other Implementations

In various implementations, decision engine 202 may implement one or more policies related to the considerations described below:

Reactivity balanced with safety—In some implementations, decision engine 202 may act to balance reactivity and safety by reaching a steady state as quickly as possible while minimizing the risk of overshooting and either overutilizing resources (dropping frames or crashing due to an out of memory (OOM) state) or causing noticeable oscillations in presentation quality.

Data over heuristics—In some implementations, decision engine may act to prioritize data over heuristics. By externalizing the data that drives decision engine 202 and giving it a predictable decision making process, the data can be optimized for particular devices and places, cached for future use, or refined using machine learning.

Transparency—In some implementations, decision engine 202 may prioritize transparency. The decision making process behind decision engine 202 must be understandable and debuggable. In order to tune the relative priority and impact of a large number of systems, it is necessary for an administrator to be able to work backwards from the desired effect to the input providing that effect.

Observability—In some implementations, decision engine 202 may prioritize observability. Decision engine 202 must be instrumented with sufficient telemetry to make it possible for an administrator to identify regressions in behavior and pathological edge cases, with automated alerting.

Uncertainty—In some implementations, decision engine 202 prioritizes uncertainty. The exact behavior of decision engine 202 is hard to predict, as functionality and content are constantly in flux. Uncertainty is modeled predictions of resource usage, so that decision engine 202 can make informed decisions about risky changes.

Adaptivity—In some implementations, decision engine 202 prioritizes adaptivity. Decision engine 202 leverages knowledge gained from observing the results of changing engine behavior to iteratively improve future decision making.

Repeatability—In some implementations, decision engine 202 prioritizes repeatability. Decision engine 202 should eventually arrive at the same resource allocation given the exact same environment, independent of how frequently it is allowed to update and how many steps it takes to get there.

In some implementations, an impact curve that measures the effect of changing the level of a particular resource utilization factor on one or more metrics may be generated. In some implementations, the relationship is monotonic: increasing the level of a resource utilization factor will either always increase the impact or always decrease the impact. Advantageously, this assumption helps simplify the decision making algorithm of decision engine 202.

In some implementations, an impact curve is defined by piecewise construction of a function that maps changes in the level of the resource utilization factor to the expected marginal increase or decrease in a particular metric. For example, if memory usage increases from 100 MB to 112 MB when the level of the resource utilization factor is changed from 3 to 4, then the curve can be incrementally defined by specifying that there is an increase by 12 MB between 3 and 4.

In some implementations, an API may be used to notify decision engine 202 of the current absolute value of each impact. This information is combined with the incremental change in impact from making a tweak to a level of a resource utilization factor to measure the predicted impact value after the change.

Advantageously, this method of modeling the mapping function provides a few important benefits, including the following. First, it is easy to incrementally update the curve locally. If a given transition between levels of resource utilization factors needs to be assigned a different cost, it is simply a matter of changing the curve locally by setting that incremental cost, and the remainder of the curve does not have to be updated. Second, the monotonicity constraint (the resource/fidelity impact is either strictly nondecreasing or strictly nonincreasing over the range of levels) is easier to maintain by simply ensuring that all delta values are positive or all of them are negative. Unlike a function mapping to absolute values, this remains true even in the presence of local updates to the curve. Third, when there are multiple resource utilization factors or other decision engine behavior touching the impact, the impact function for each individual resource utilization factor can ignore the others.

In some implementations, it may be desirable to use impact measurements that are as specific as possible, such as an impact that is only affected by the resource utilization factor in question. This makes it easier to predict the exact change in the impact when a level of a resource utilization factor is modified. At the same time, it is desirable to share the impacts across resource utilization factors as much as possible to make it easier to compare the relative utility of each factor. One way to meet both of these requirements is to support nested impacts that are specific to a resource utilization factor but are part of a global impact. For example, if the impact of sound quality changes is "sound memory," it may be useful to consider that it contributes to a shared impact of "memory" when making resource decisions, while being able to precisely measure how "sound memory" is affected by changes to resource utilization factors at any point in time without interference from other systems.

In some implementations, decision engine 202 generates a confidence interval for a particular prediction. An upper expectation value may be specified, representing the 95th percentile (26) of the expected value. A lower bound may be inferred by symmetry (assuming a logarithmic distribution to maintain monotonicity). Other methods may be used to generate a confidence interval.

Advantageously, expressing uncertainty explicitly provides to decision engine 202 information indicating how much headroom to leave when changing a level of a resource utilization factor in order to better avoid overusing a resource. For example, such information can be used to determine the likelihood of triggering an out of memory (OOM) condition.

Different types of impact are not inherently comparable. For example, it is difficult to compare a megabyte of memory worth to a microsecond of frame time, or to a single texture rendering at a higher resolution. While individually these impacts can and should be directly measurable, there is no obvious way to weigh them against each other. Advantageously, decision engine 202 performs such comparisons in order to make tradeoff decisions. In order to make such tradeoffs, decision engine 202 may generate a mapping of impact to utility.

In some implementations, decision engine 202 monitors changes to both the current utilization and capacity. In many cases, capacity is not because other applications sharing the host device will claim some of the available resources.

In some implementations, for selected resources, decision engine 202 is periodically informed of current utilization and capacity. For resources with a finite capacity, such as memory, the utility curve will start flat and then grow exponentially as it approaches the capacity limit.

In some implementations, since fidelity impacts are not generally dealing with a finite resource, and the measure of their relative value is highly subjective, a system for assigning utility based on human judgment and feedback from user behavior may be employed.

In some implementations, a developer may assign values for a resource utilization factor against a standardized benchmark of quality. For example, if the user experience is divided into one to five stars, the developer of a resource utilization factor may pick levels for the factor that map to each quality level. For example, a four-star experience may mean setting a resource utilization factor associated with texture quality to level 12. Decision engine 202 may then be able to interpolate between the provided levels for more fine-grained management of fidelity.

In some implementations, a resource utilization factor is provided with sufficient data meeting some structural constraints in order to be functional. Specifically, there is some tradeoff. Resource curves going in opposite directions, or resource usage exchanged for increased fidelity. All impact curves are monotonic and there are no gaps in the valid range of the tunable. Every impact has an associated utility curve.

Any valid resource utilization factor or metric may then be sent to decision engine 202. The factor or metric may be modified and updated by decision engine 202 at any time, making it easy to modify the impact and utility curves as newly discovered information or changes in the environment dictate.

In some implementations, decision engine 202 periodically takes the latest resource measurements, resource utilization factor definitions, and metric definitions, and generates a list of resource utilization factor levels and/or metric value ranges to change in order to incrementally improve the global tradeoff between resource usage and fidelity.

Resource utilization factors and metrics are examined at appropriate times to apply the requested change. New resource utilization factor levels and metrics may be applied immediately or over time. There might be external events that require changes to a resource utilization factor level or metric value range (for example, an external state change means the resource utilization factor range has changed and the current level needs to be adjusted).

Utility Function for Resource Utilization Factors

Resource utilization factors and metrics are examined at appropriate times to apply the requested change. New resource utilization factor levels and metrics may be applied immediately or over time. There might be external events that require changes to a resource utilization factor level or metric value range (for example, an external state change means the resource utilization factor range has changed and the current level needs to be adjusted).

The output of this calculation is a list of utility values, one per resource utilization factor. Decision engine 202 may select the highest N resource utilization factors (just picking the top factor may be the more precise but require more iterations to make the same number of changes), update the current resource usage by the predicted change from that resource utilization factor, and repeat the calculation until enough resource utilization factor updates have accumulated, or the best is negative or falls below some threshold, thus representing a steady state. The increasing uncertainty of successive iterations will naturally lead to decline in the projected gain, so the process should terminate after a few iterations.

It is notable that while is monotonic because the composition of two monotonic functions is itself monotonic, the sum of utility values for all impacts will have no such guarantee. This means that decision engine 202 must be able to identify and search past local maxima in order to find the global utility maximum.

In the presence of uncertainty distributions for the predicted function impact, this algorithm needs to operate on distributions instead of numbers and the resulting value represents the expected value of the distribution. This may require sampling the impact curves using the provided distribution and calculating a weighted average of utility change.

In some implementations, every planning period (e.g., once every frame), decision engine 202 examines each resource utilization factor and evaluates the benefit of increasing the factor by an increment (e.g., one level). This benefit is calculated by using impact and utility curves associated with the resource utilization factor. Impact and utility curves are generated as follows.

For each impact type, the expected change in impact is given by the impact curve for the resource utilization factor. This is calculated as the difference between impact at the current resource utilization factor level and the impact with the adjusted level (e.g., up or down one level).

The change in impact (e.g. memory usage, texture quality, etc.) then needs to be evaluated for its overall value to the user experience, or utility. This is accomplished by applying the change in impact to the current impact level using a utility curve that is defined for each impact type. This step may be achieved in a manner similar to the previous step, but using a different curve and inputs.

Finally, the overall change in utility is calculated by adding the utility change from every impact for a given resource utilization factor. The resource utilization factor change with the largest cumulative impact is then applied. This process is repeated a predetermined number of times (e.g., 5) before decision engine 202 determines a list of desired resource utilization factor changes. Decision engine 202 may apply these changes before executing the next planning phase.

Figure 6:
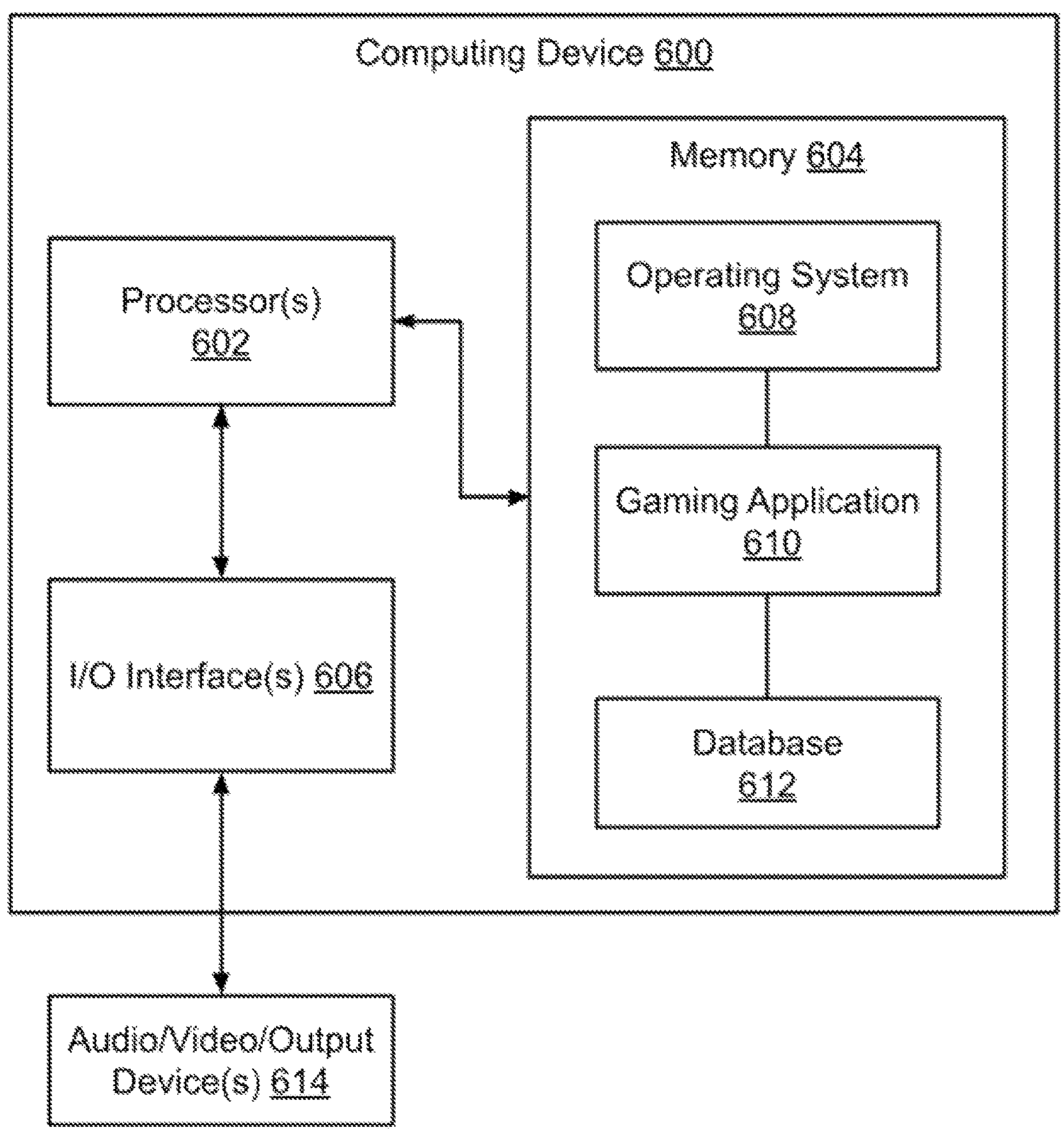
FIG. 6 is a block diagram of an example computing device which may be used to implement one or more features described herein.

FIG. 6: Example computing device

FIG. 6 is a block diagram of an example computing device 500 which may be used to implement one or more features described herein. In one example, device 500 may be used to implement a computer device (e.g. 102 and/or 110 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., an audio spatialization application, and database 612. In some implementations, application 610 can include instructions that enable processor 602 to perform the functions (or control the functions of) described herein, e.g., some or all of the methods described with respect to FIG. 4.

For example, application 610 can include an audio spatialization module, which can provide audio spatialization within an online virtual experiences server (e.g., 102). Elements of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 120), and input/output devices can communicate via interface 506. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 614 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 6 shows one block for each of processor 602, memory 604, I/O interface 606, and software blocks of operating system 608 and application 610. These blocks may represent one or more processors or processing circuitries, operating systems, memories, I/O interfaces, applications, and/or software engines. In other implementations, device 600 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:

defining at least one metric associated with a user experience within a virtual experience managed by a server system;

defining a resource utilization factor associated with a presentation quality of the virtual experience, the resource utilization factor having a plurality of levels corresponding to respective amounts of resource utilization by the server system, the resource utilization relating to use of at least one of processing power, memory, or network bandwidth;

defining a knob having a plurality of settings, each setting corresponding to a respective level of the resource utilization factor, wherein the knob is associated with the presentation quality of the virtual experience and is adjustable to execute a tradeoff between the resource utilization and the presentation quality of the virtual experience by modifying the presentation quality of the virtual experience;

generating a prediction that associates a particular level of the resource utilization factor with a particular value of the at least one metric; and adjusting the knob from a first setting to a second setting associated with the particular level of the resource utilization factor, based on the prediction, to execute the tradeoff between the presentation quality and the resource utilization.

2. The computer-implemented method of claim 1, further comprising:

generating a model adapted to predict a relationship between the resource utilization factor and the at least one metric, wherein generating the prediction that associates the particular level of the resource utilization factor with the particular value of the at least one metric is based on the model.

3. The computer-implemented method of claim 1, wherein the at least one metric comprises a measure of one of: a frame rate, an update latency, a coherence level, a functional world available, a simulation level, a probability of a crash, and a memory management.

4. The computer-implemented method of claim 1, wherein the resource utilization factor comprises one of: a draw distance, a rendering resolution, an animation throttling, a view distance, a texture, a mesh fidelity, a video playback rate, a music and sound effect, a visual effect, a lighting fidelity, and a physics or animation throttling.

5. The computer-implemented method of claim 1, wherein the adjusting is performed in response to the particular value of the at least one metric meeting a threshold to modify the presentation quality such that the resource utilization is reduced to a second level of the resource utilization factor that is lower than the particular level of the resource utilization factor.

6. The computer-implemented method of claim 1, further comprising:

defining a second resource utilization factor having a plurality of second levels corresponding to respective second amounts of resource utilization by the server system;

defining a second knob having a plurality of second settings, each second setting of the second knob corresponding to a respective second level of the second resource utilization factor;

generating a second prediction that associates a particular second level of the second resource utilization factor with the particular value of the at least one metric; and adjusting the second knob from a first second setting of the second knob to a second second setting of the second knob associated with the particular second level of the second resource utilization factor, based on the second prediction.

7. The computer-implemented method of claim 1, wherein the prediction indicates that at least one level of the resource utilization factor is associated with a predicted value of the at least one metric that is below a predetermined limit, wherein adjusting the knob from the first setting to the second setting associated with the particular level of the resource utilization factor is performed in order to reduce resource utilization and ensure that an actual value of the at least one metric does not fall below the predetermined limit, based on the prediction.

8. The computer-implemented method of claim 1, wherein the prediction indicates that at least one level of the resource utilization factor is associated with a predicted value of the at least one metric that is outside of a predetermined range, wherein adjusting the knob from the first setting to the second setting associated with the particular level of the resource utilization factor is performed in order to reduce resource utilization and ensure that an actual value of the at least one metric does not fall outside of the predetermined range, based on the prediction.

9. A device comprising:

a memory storing computer program instructions; and a processor communicatively coupled to the memory, the processor configured to execute the computer program instructions which, when executed on the processor, cause the processor to perform operations comprising:

defining at least one metric associated with a user experience within a virtual experience managed by a server system;

defining a resource utilization factor associated with a presentation quality of the virtual experience, the resource utilization factor having a plurality of levels corresponding to respective amounts of resource utilization by the server system, the resource utilization relating to use of at least one of processing power, memory, or network bandwidth;

defining a knob having a plurality of settings, each setting corresponding to a respective level of the resource utilization factor, wherein the knob is associated with the presentation quality of the virtual experience and is adjustable to execute a tradeoff between the resource utilization and the presentation quality of the virtual experience by modifying the presentation quality of the virtual experience;

generating a prediction that associates a particular level of the resource utilization factor with a particular value of the at least one metric; and adjusting the knob from a first setting to a second setting associated with the particular level of the resource utilization factor, based on the prediction, to execute the tradeoff between the presentation quality and the resource utilization.

10. The device of claim 9, the operations further comprising:

generating a model adapted to predict a relationship between the resource utilization factor and the at least one metric, wherein generating the prediction that associates the particular level of the resource utilization factor with the particular value of the at least one metric is based on the model.

11. The device of claim 9, wherein the at least one metric comprises a measure of one of: a frame rate, an update latency, a coherence level, a functional world available, a simulation level, a probability of a crash, and a memory management.

12. The device of claim 9, wherein the resource utilization factor comprises one of: a draw distance, a rendering resolution, an animation throttling, a view distance, a texture, a mesh fidelity, a video playback rate, a music and sound effect, a visual effect, a lighting fidelity, and a physics or animation throttling.

13. The device of claim 9, the operations further comprising:

defining a minimum value of the at least one metric, wherein the particular value of the at least one metric is the minimum value of the at least one metric.

14. The device of claim 9, the operations further comprising:

defining a second resource utilization factor having a plurality of second levels corresponding to respective second amounts of resource utilization by the server system;

defining a second knob having a plurality of second settings, each second setting of the second knob corresponding to a respective second level of the second resource utilization factor;

generating a second prediction that associates a particular second level of the second resource utilization factor with the particular value of the at least one metric; and adjusting the second knob from a first second setting of the second knob to a second second setting of the second knob associated with the particular second level of the second resource utilization factor, based on the second prediction.

15. A non-transitory computer readable medium having stored thereon software instructions that, when executed by a processor, cause the processor to execute a set of operations comprising:

defining at least one metric associated with a user experience within a virtual experience managed by a server system;

defining a resource utilization factor associated with a presentation quality of the virtual experience, the resource utilization factor having a plurality of levels corresponding to respective amounts of resource utilization by the server system, the resource utilization relating to use of at least one of processing power, memory, or network bandwidth;

defining a knob having a plurality of settings, each setting corresponding to a respective level of the resource utilization factor, wherein the knob is associated with the presentation quality of the virtual experience and is adjustable to execute a tradeoff between the resource utilization and the presentation quality of the virtual experience by modifying the presentation quality of the virtual experience;

generating a prediction that associates a particular level of the resource utilization factor with a particular value of the at least one metric; and adjusting the knob from a first setting to a second setting associated with the particular level of the resource utilization factor, based on the prediction, to execute the tradeoff between the presentation quality and the resource utilization.

16. The non-transitory computer readable medium of claim 15, wherein the at least one metric comprises a measure of one of: a frame rate, an update latency, a coherence level, a functional world available, a simulation level, a probability of a crash, and a memory management.

17. The non-transitory computer readable medium of claim 15, wherein the resource utilization factor comprises one of: a draw distance, a rendering resolution, an animation throttling, a view distance, a texture, a mesh fidelity, a video playback rate, a music and sound effect, a visual effect, a lighting fidelity, and a physics or animation throttling.

18. The non-transitory computer readable medium of claim 15, the operations further comprising:

defining a minimum value of the at least one metric, wherein the particular value of the at least one metric is the minimum value of the at least one metric.

19. The non-transitory computer readable medium of claim 15, wherein the prediction indicates that at least one level of the resource utilization factor is associated with a predicted value of the at least one metric that is below a predetermined limit;

the operations further comprising:

adjusting the knob from the first setting to the second setting associated with the particular level of the resource utilization factor in order to reduce resource utilization and ensure that an actual value of the at least one metric does not fall below the predetermined limit, based on the prediction.

20. The non-transitory computer readable medium of claim 15, wherein the prediction indicates that at least one level of the resource utilization factor is associated with a predicted value of the at least one metric that is outside of a predetermined range;

the operations further comprising:

adjusting the knob from the first setting to the second setting associated with the particular level of the resource utilization factor in order to reduce resource utilization and ensure that an actual value of the at least one metric does not fall outside of the predetermined range, based on the prediction.

* * * * *